(12) United States Patent  (10) Patent No.: US 7,827,058 B2
Mortimer  (45) Date of Patent: Nov. 2, 2010

(54) SYSTEM AND METHOD FOR PROVIDING CROSS-MERCHANDISING INCENTIVES IN SPECIALTY DEPARTMENTS

(75) Inventor: Lawrence Mortimer, Denver, CO (US)

(73) Assignee: Alerion Investment Partners I, L.P., Rowayton, CT (US)

( * ) Notice: Subject to any disclaimer, the term of this patent is extended or adjusted under 35 U.S.C. 154(b) by 0 days.

(21) Appl. No.: 11/076,805

(22) Filed: Mar. 10, 2005

(65) Prior Publication Data

US 2005/0154641 A1  Jul. 14, 2005

Related U.S. Application Data

(63) Continuation of application No. 10/249,886, filed on May 15, 2003, now abandoned, which is a continuation-in-part of application No. 10/328,928, filed on Dec. 24, 2002, now abandoned.

(60) Provisional application No. 60/382,507, filed on May 21, 2002.

(51) Int. Cl.
*G06Q 30/00* (2006.01)
(52) U.S. Cl. ............ 705/14.34; 705/14.38; 705/14.1; 283/81
(58) Field of Classification Search ............ 705/14.34, 705/14.38, 14.1; 283/81
See application file for complete search history.

(56) References Cited

U.S. PATENT DOCUMENTS

| 2,420,045 | A | 5/1947 | Krug |
|---|---|---|---|
| 4,188,250 | A | 2/1980 | Grass |
| 4,188,251 | A | 2/1980 | Grass |
| 4,188,427 | A | 2/1980 | Grass |
| 4,723,212 | A | 2/1988 | Mindrum et al. |
| 5,173,851 | A | 12/1992 | Off et al. |
| 5,557,721 | A | 9/1996 | Fite et al. |
| 5,578,797 | A | 11/1996 | Hewitt et al. |
| 5,612,868 | A | 3/1997 | Off et al. |
| 5,621,812 | A | 4/1997 | Deaton et al. |
| 5,638,457 | A | 6/1997 | Deaton et al. |
| 5,642,485 | A | 6/1997 | Deaton et al. |
| 5,644,723 | A | 7/1997 | Deaton et al. |
| 5,649,114 | A | 7/1997 | Deaton et al. |
| 5,659,469 | A | 8/1997 | Deaton et al. |
| 5,675,662 | A | 10/1997 | Deaton et al. |
| 5,687,322 | A | 11/1997 | Deaton et al. |

(Continued)

FOREIGN PATENT DOCUMENTS

EP   0 568 088 A2  *  11/1993

OTHER PUBLICATIONS

Dialog file 570 # 01870736, "Media Magic, In-store; the lure of the kiosk, the charm of Special Offer-Retailers are exploring the old merchandisingg secrets with new approaches" by Mina Williams.*

*Primary Examiner*—Raquel Alvarez
(74) *Attorney, Agent, or Firm*—Cooper & Dunham LLP

(57) ABSTRACT

A system and method for providing incentives within a retail environment by selecting a cross-merchandising incentive to be provided with a product at a specialty department location and printing a coupon reflecting the defined cross-merchandising incentive on a label that is to be affixed to the product. The coupon is provided to a shopper at a point after the shopper has selected the specific product and before a point of sale.

13 Claims, 5 Drawing Sheets

U.S. PATENT DOCUMENTS

| | | |
|---|---|---|
| 5,702,127 A | 12/1997 | Korondi, Jr. |
| 5,708,782 A | 1/1998 | Larson et al. |
| 5,710,416 A | 1/1998 | Belknap et al. |
| 5,710,886 A | 1/1998 | Christensen et al. |
| 5,727,153 A | 3/1998 | Powell |
| 5,734,838 A | 3/1998 | Robinson et al. |
| 5,734,839 A | 3/1998 | Enoki et al. |
| 5,806,044 A | 9/1998 | Powell |
| 5,821,513 A | 10/1998 | O'Hagan et al. |
| 5,822,735 A | 10/1998 | DeLapa et al. |
| 5,832,457 A | 11/1998 | O'Brien et al. |
| 5,845,259 A | 12/1998 | West et al. |
| 5,855,007 A | 12/1998 | Jovicic et al. |
| 5,857,175 A | 1/1999 | Day et al. |
| 5,859,414 A | 1/1999 | Grimes et al. |
| 5,884,277 A | 3/1999 | Khosla |
| 5,887,271 A | 3/1999 | Powell |
| 5,890,135 A | 3/1999 | Powell |
| 5,892,827 A | 4/1999 | Beach et al. |
| 5,907,830 A | 5/1999 | Engel et al. |
| 5,915,007 A | 6/1999 | Klapka |
| 5,926,795 A | 7/1999 | Williams |
| 5,970,469 A | 10/1999 | Scroggie et al. |
| 5,974,399 A | 10/1999 | Giuliani et al. |
| 5,995,015 A | 11/1999 | DeTemple et al. |
| 6,014,634 A | 1/2000 | Scroggie et al. |
| 6,026,370 A | 2/2000 | Jermyn |
| 6,067,524 A | 5/2000 | Byerly et al. |
| 6,240,394 B1 | 5/2001 | Uecker et al. |
| 6,278,979 B1 | 8/2001 | Williams |
| 6,282,516 B1 | 8/2001 | Giuliani |
| 6,304,849 B1 | 10/2001 | Uecker et al. |
| 6,307,958 B1 | 10/2001 | Deaton et al. |
| 6,321,210 B1 | 11/2001 | O'Brien et al. |
| 6,334,108 B1 | 12/2001 | Deaton et al. |
| 6,351,735 B1 | 2/2002 | Deaton et al. |
| 6,377,935 B1 | 4/2002 | Deaton et al. |
| 6,421,986 B1 * | 7/2002 | Dharssi ........................ 53/474 |
| 6,424,949 B1 | 7/2002 | Deaton et al. |
| 6,484,146 B2 | 11/2002 | Day et al. |
| 6,536,951 B1 | 3/2003 | Sill |
| 7,026,556 B1 | 4/2006 | Schuller |
| 7,099,038 B2 * | 8/2006 | Schuller .................... 358/1.18 |
| 2003/0137143 A1 * | 7/2003 | Itkis et al. ...................... 283/49 |
| 2003/0173118 A1 | 9/2003 | Schuller |
| 2003/0205412 A1 | 11/2003 | Hewitt et al. |
| 2004/0049422 A1 | 3/2004 | Mortimer |
| 2004/0211600 A1 | 10/2004 | Schuller et al. |
| 2004/0267621 A1 | 12/2004 | Schuller et al. |
| 2005/0037172 A1 | 2/2005 | Adams et al. |
| 2005/0055637 A1 | 3/2005 | Schuller |

* cited by examiner

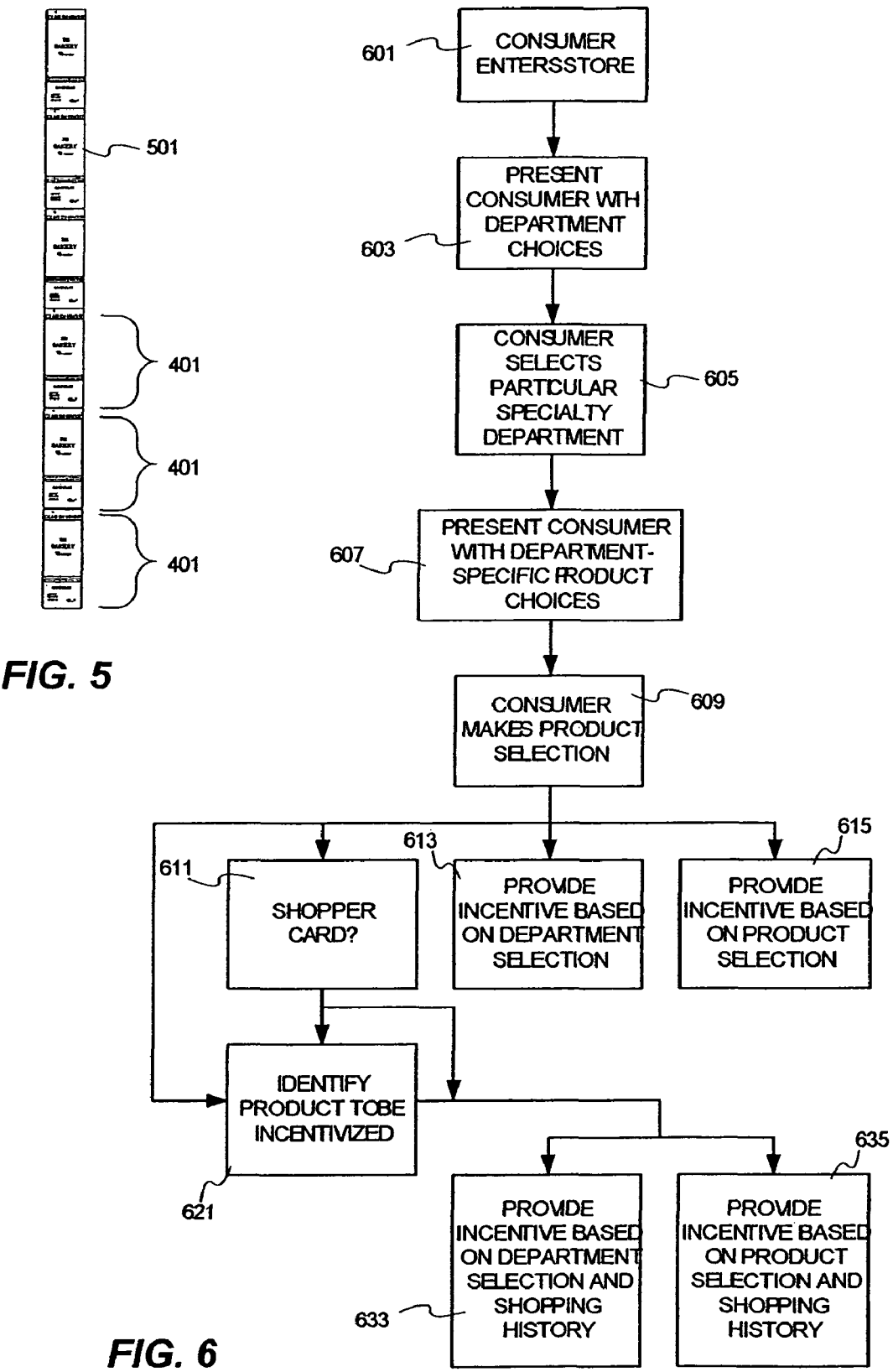

SYSTEM AND METHOD FOR PROVIDING CROSS-MERCHANDISING INCENTIVES IN SPECIALTY DEPARTMENTS

CROSS-REFERENCE TO RELATED APPLICATIONS

This application claims the benefit of U.S. Provisional Application No. 60/382,507, filed May 21, 2002. This application is a continuation of U.S. Ser. No. 10/249,886 filed May 15, 2003 now abandoned, which is a continuation-in-part of U.S. Ser. No. 10/328,928 filed Dec. 24, 2002 and now abandoned, which claimed priority to U.S. Provisional Application No. 60/382,507, filed May 21, 2002, each of these documents of which is incorporated herein by reference.

BACKGROUND OF THE INVENTION

The present invention relates, in general, to coupons and other retail sales incentives, and, more particularly, to software, systems and methods for providing cross-merchandising incentives in specialty departments, preferably occurring at or near the point of product selection by a consumer.

Manufacturers and retailers use a variety of incentive mechanisms to motivate consumer shopping and purchasing behavior. Shopping behavior refers generally to the selection of one retail store over another, whereas purchasing behavior refers to the selection of particular products to purchase irrespective of the retail store. Historically, these incentives take the form of discounts or coupons that encourage store or brand loyalty, test price points, or simply encourage a consumer to purchase a particular product.

Given the expense of incentive systems to manufacturers and retailers, it remains a continuing problem to improve efficiency. Coupon distribution has a significant impact on efficiency. Coupon distribution will affect who receives a coupon, how the coupon is received, and when the coupon is received. Any or all of these factors may affect the consumers ability or willingness to redeem the coupon. Untargeted coupons distributed through newspapers and magazines, for example, generally have a very low redemption rate. Most people are familiar with receiving coupons for products they do not use, often at inconvenient times. Direct mail coupons offer the potential of targeting based on demographics, or upon consumer-specific shopping history. These targeted methods have higher redemption rates, but remain relatively inefficient.

Recently, point-of-sale (POS) coupons have been introduced. POS coupon systems enable a retailer to print coupons that are specifically relevant to a particular consumer based on items purchased during a particular transaction, and/or based upon shopping history. These coupons are intended to provide and incentive for the consumer to return to the issuing store at some time in the future. The coupons can be based on products purchased to either improve brand loyalty, or to encourage the consumer to try a competing product (e.g., house brands). Moreover, POS coupons may encourage purchase of other goods or services offered by the retailer such as pharmacy, photo processing, or video rental.

Commercially available printers may be used for generating coupons at a point-of-sale, such as disclosed in U.S. Pat. No. 4,723,212 issued on Feb. 2, 1988 and entitled Method and Apparatus for Dispensing Discount Coupons or as further disclosed in U.S. Pat. No. 4,910,672 issued Mar. 20, 1990 and entitled Method and Apparatus for Dispensing Discount Coupons. As disclosed in these patents, systems may be provided to generate coupons at the point-of-sale based upon the type of product purchase. In the disclosures of the above-captioned two patents, a coupon relating to a particular type of a product is generated based upon a bar code reader determining that a triggering or competing product has just been purchased by the consumer.

In spite of the high level of control promised by POS coupon systems, they provide their incentive after a sale is complete. In many cases, an incentive to buy brand Y next time has little effect when the consumer just purchased brand Xt may be weeks or months until the product must be purchased again. Even when the incentives relate to products not purchased, it is unlikely that the consumer will re-enter the store immediately to take advantage of the incentive. Hence, the consumer is likely to misplace, discard, or simply forget about the coupon before it can be redeemed.

An alternative coupon distribution method is to attach coupons to products themselves either as instantly redeemable coupons or for redemption upon a subsequent purchase. Such coupons can be for the product to which they are attached (e.g., a box of cereal), or for complementary products (e.g., a coupon for milk attached to a box of cereal). In addition to manufacture coupons, specialty areas of grocery stores such as meat, fish, deli, pharmacy and similar departments may use attached coupons to provide various incentives as well. For example, a bakery department may attach a discount coupon to some packages in order to encourage sales of day old bread.

However, these prior incentive programs are not specifically used for cross-merchandising other products or services within the store before the consumer has completed a purchase transaction. A cross-merchandising incentive is one that encourages the consumer to purchase a different product from the product to which the coupon or incentive is most directly associated. Until now, incentive systems have failed to use the valuable consumer interaction that occurs at the point of product selection to attempt to influence consumer behavior in the purchase of products that are different from the product that is being selected.

Hence, a need exists for a system and method that provides cross-merchandising incentives in specialty departments, preferably occurring at or near the point of product selection by a consumer.

SUMMARY OF THE INVENTION

Briefly stated, the present invention involves system and method for providing incentives within a retail environment by selecting a cross-merchandising incentive to be provided with a product at a specialty department location and printing a coupon reflecting the defined cross-merchandising incentive on a label that is to be affixed to the product. The coupon is provided to a shopper at a point after the shopper has selected the specific product and before a point of sale.

In another aspect, the present invention involves a method for providing incentives by estimating a consumer desire from a product selection in a specialty department. The consumer desire may be estimated from the selection of a particular specialty department and/or selection of a particular product. A coupon is provided to the consumer based on the estimated consumer desire, wherein the coupon is for a product different from the product selected in the specialty department.

BRIEF DESCRIPTION OF THE DRAWINGS

FIG. 5 illustrates a roll of label coupons in a form for practical delivery within a retail environment; and FIG. 6 illustrates, in flow-diagram form, activities involved in a shopping experience involving various features of the present invention.

DETAILED DESCRIPTION

Figure 1:
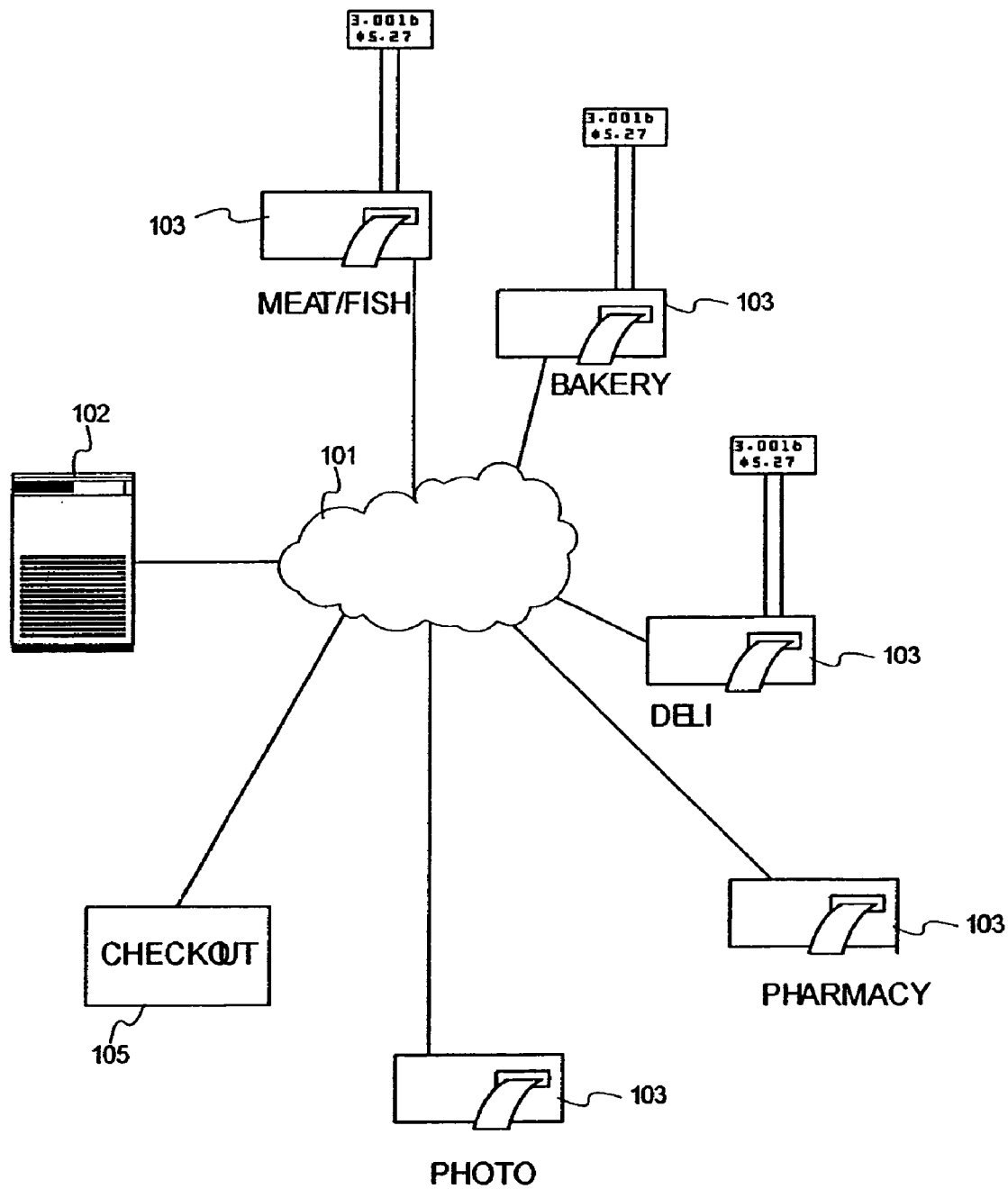
FIG. 1 shows an networked retail environment in which the present invention is implemented.

The present invention is directed to a coupon system implemented in a retail grocery store having one or more specialty departments. In these specialty departments, a consumer selects goods and interacts with the retailer before the point-of-sale. During this interaction, a label of some kind is often printed to identify the product and pricing. The present invention leverages this installed system of label printing to provide incentive coupons at the point of product selection. These "label coupons" can be used to direct consumer purchases during the immediate shopping session, rather than requiring a subsequent trip back to the store.

These label coupons are readily used to provide incentives to purchase complementary goods and/or services. For example, when a consumer selects a cut meat from the meat department, a coupon for complementary sauces, vegetables, or other products can be printed. The value of the coupon can be readily adjusted based on the value of the meat (or other product) selected. In another example, a consumer may select a number of picnic type items from the deli department which could produce a coupon for discounted film or photo processing. It is contemplated that the pre-point-of-sale incentive system of the present invention can be implemented with great flexibility and provides advantages that both complement and replace some of the advantages of prior coupon systems.

The preferred implementations involve dynamic coupons, where the coupon identifies a qualifying product and/or a discount amount in response to the customer-selected product identified by the label to which the coupon is attached. This allows the coupons to be product-specific in that coupons for "turkey" at a deli department can be different than coupons for "roast beef". However, it is contemplated that pre-printed coupons may also be provided. Preprinted coupons can be department-specific (as shown in steps 613/633 in FIG. 6) rather than product-specific (as shown in steps 615/635 in FIG. 6). For example, rolls 501 (shown in FIG. 5) of pre-printed coupons at a fish counter may be different than rolls 501 of pre-printed coupons at a deli counter.

In either case, incentives are provided to a customer based upon customer product selection, and are provided before the point-of-sale. An important aspect of the present invention is the recognition that at the point of product selection the consumer is expressing unique and valuable information about the consumer's immediate, instantaneous desires, needs and intentions. This expression is fundamentally different than what is expressed by reviewing the customer's shopping history, for example.

At the same time, the present invention enables the marketer to use this information immediately by providing incentives that are responsive to this immediate expression of desires, needs and intentions. Some in-store coupon systems attempt to provide incentives based solely on shopping history or other information so as to direct the consumer to a particular product selection, rather than in response to the product selection. As a result, they fail to utilize this extremely valuable information provided by the customer's product selections at the point in time where this information is most valuable. Whether the incentives are printed dynamically or are pre-printed and affixed to the product that is selected, the act of providing the incentive based in whole or in part on the product selection and before the point of sale is a powerful tool for affecting in-store customer behavior.

Although the particular examples provided herein are directed to retail grocery stores with conventionally-defined specialty departments, it should be understood that the invention is broadly applicable to other environments. For example, department stores may provide an opportunity for label couponing as products are selected in one department to provide incentives to use other departments. Also, specialty departments may be flexibly defined to include any product selection point where it is practical for the retailer to print a label with appropriate incentives in accordance with the present invention prior to the point-of-sale.

FIG. 1 shows an exemplary retail environment having a number of specialty departments. Each specialty department is represented by one or more terminals 103 that include label printing devices, often integrated with a scale or other department-specific mechanism. For example, the deli department typically has a scale and label printer. A pharmacy department has printers for prescription labels and drug information sheets that are specific to the particular transaction. These systems may be stand-alone, or may be coupled to one or more centralized data possessing systems such as server 102 through an in-store network 101. Network 101 may comprise a local area network (LAN) or wide area network (WAN) of any topology, and may be entirely private or involve public communication channels such as the Internet. All or part of network 101 may be implemented by wireless links.

In each specialty department 103, a customer selects products and/or services that are provided by the retailer. For example, a meat department will provide a customer-selected quantity of a customer-selected product. In a deli department, a wide variety of goods may be selected. Significantly, these customer selections are made before the customer reaches checkout 105. Hence, after the product selection the customer remains in the store to continue shopping.

The present invention is readily adapted to various styles of label printers and label media. The particular examples herein show single sided, single ply label printing media. However, dual side printing is easily implemented and may be especially useful when coupons are pre-printed. Moreover, coupons may be printed on multi-ply paper such that the pre-printed coupons appear underneath the product identification label. A variety of label printing devices are used at centralized packaging and distribution sites as well. The present invention is readily adapted to operate with any printing system in the distribution chain of a product where a label/coupon can be printed or applied to the packaging with knowledge of some characteristic feature of the product that is being labeled. For example, when meat, cheese, and other perishable products are labeled, the labeling systems are aware of what the product is, the product grade, the package size, use-by dates, and a variety of other kinds of information that are unique to the particular package being labeled. These characteristics are effective shopping behavior indicators because, eventually, a consumer will select the particular package based on some or all of these characteristics. Hence, a coupon or other incentive can be applied to the package based on these characteristics in a way that is responsive to the customer selection criteria, even before the customer has made the selection. The various unique characteristics of a particular package can be used to anticipate the customers desires, needs and intentions which are in turn used to select a particular incentive to be applied to that package.

By way of a simple example, a consumer that selects a ten pound package of hamburger patties likely has different shopping intentions than another consumer that selects a one pound package of loose ground beef. One might anticipate that the first consumer is planning a large barbeque while the second consumer is shopping for everyday needs. This anticipatory knowledge is used to select the coupons applied to the package so as to provide incentives for other products that would be used by the consumer given this anticipatory knowledge of the consumers' shopping intentions. In this manner, pre-printed coupons provided after the customer's selection. These and similar modifications are within the scope of the present invention.

The present invention is particularly useful in affecting in-store consumer behavior. The present invention recognizes that incentives provided at the point of customer selection, yet before the customer reaches the point of sale to consummate the purchase, provide a unique method to monitor and affect in-store customer behavior. Based on the product selection, the terminal in the specialty department queries an incentive database to identify incentives that are associated with the customer's product selection. In many cases, there may be a pool of incentives that are available, and processes implemented in the terminal select one or more incentives from the pool. The selected incentives are implemented as printed coupons. Preferably, the coupons are printed integrally with pre-existing label printing processes so that little overhead is incurred to provide the coupons.

The incentive database comprises information about available manufacturer or retailer sponsored incentives and implements an association between products and incentives. A given product may be associated with one or more incentives. Similarly, a given incentive may be associated with one or more products.

The incentive database may be maintained locally in each terminal, but is preferably implemented in a shared resource such as server 102. In particular embodiments, a fixed number (e.g., three) of coupons are printed for any product selection. Where more than the fixed number of incentives are associated with the product selection, a round-robin or random process may be used to identify the fixed number of incentives that will be printed as coupons. The coupons may be pre-printed on the tape used to print the label, in which case the selection of which coupons are associated with a particular label is pre-established. Alternatively, the present invention may be implemented by mixing pre-established or pre-printed coupons with dynamically generated coupons. For example, the label tape may be pre-printed with coupons for a particular product type, and the discount amount filled in during the label printing process based on the particular customer selection.

Figure 2:
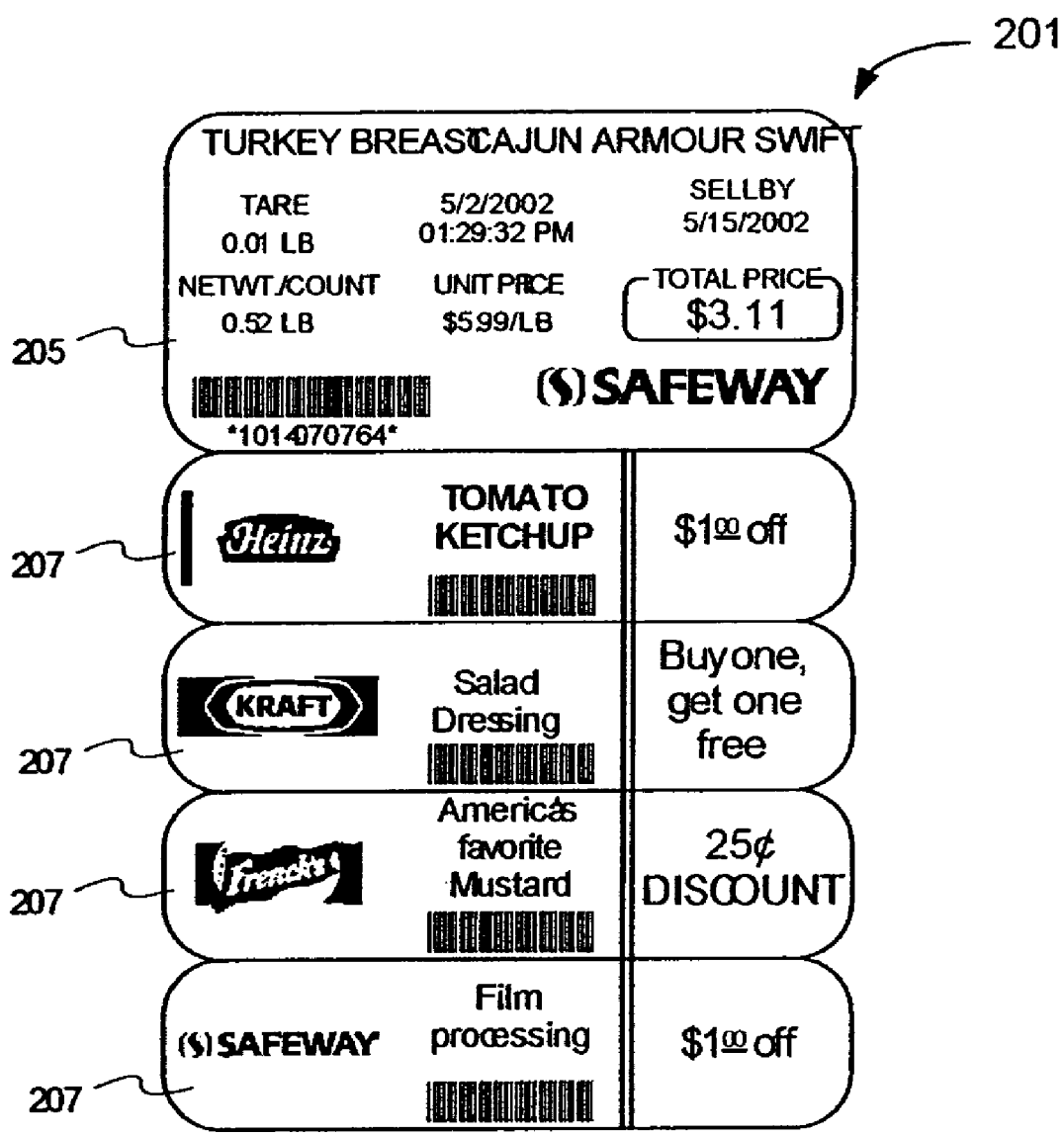
FIG. 2 shows example label coupons in accordance with the present invention.

FIG. 2 shows an exemplary label coupon 201 in accordance with the present invention. A label coupon 201 includes a product selection information portion 205 that contains information relevant to the particular customer's selections. For example, this information may include a product name, brand name, weight, quantity, unit price, shelf life information, and the like. Additionally, each label 201 comprises one or more label coupons 207 implementing incentive offers for selected products. The selected products are preferably based upon the customer selected product, and are preferably associated with complementary goods and/or services. The coupons 207 may implement incentives for manufacture goods and/or services, or private label (i.e., house brand) goods and/or services.

The selection of which goods and/or services are complementary to a given customer product selection is left to the manufacturer, retailer, and marketing organizations. The association of a given incentive to a given product may change at any time. Moreover, other criteria may be taken into account in selecting a particular set of incentives to implement (i.e., print) for a particular product selection instance. For example, customer shopping history (as shown in action 611 in FIG. 6), previously selected products, customer demographics, or other information may be taken into account in the selection of incentives from the pool of available incentives associated with a particular customer product selection. This information may be supplied by using a shopping card or loyalty card, for example, or by any other available customer identification means such as smart cards, bank check information, biometrics, or the like in combination with customer profile data or database. Also, the incentives may be based on a variety of criteria related to the particular customer selection. For example, a different set of coupons may be printed for a customer selecting ten pounds of hamburger patties (suggesting a large picnic) than would be provided to a customer selecting one pound of hamburger patties (suggesting a simple family meal).

In one embodiment, each coupon 207 is printed with a barcode indicator that can be scanned at the register 105 for redemption. Coupons 207 that are used will be matched against purchased items in a conventional manner. 207 that are not used can be logged for analysis to determine in real time whether a particular incentive is having a desired affect on customer behavior.

Coupons 207 may be implemented as conventional coupons with a specified expiration date, or may be specified to expire upon this shopping session. Allowing coupons to extend to subsequent shopping sessions encourages store loyalty. Providing for immediate coupon expiration encourages specific customer behavior, and allows resources allocated to the coupon to be reallocated to existing shoppers.

Figure 3:
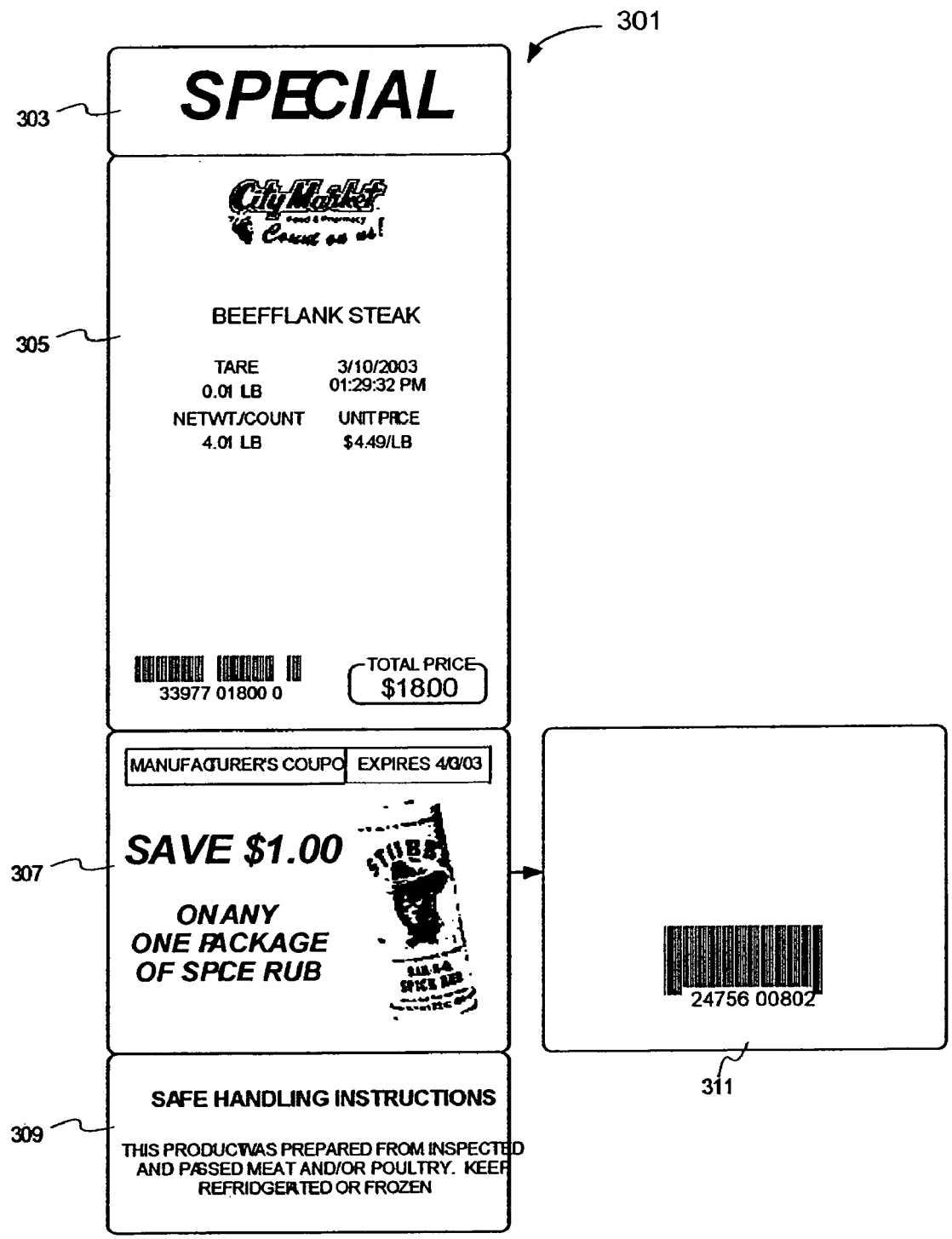
FIG. 3 illustrates and alternative example label coupon in accordance with the present invention.

FIG. 3 illustrates and alternative example label coupon in accordance with the present invention. The example of FIG. 3 shows a label 301 used in a meat or butcher department. Label 301 includes a first portion 303 such as a banner or tab that is used in some labels to promote in-store specials and the like. In some cases, portion 301 has a reduced adhesive property to allow label 301 to be removed more easily. Product information portion 305 may include pre-printed elements and product-specific elements that are printed at the time the product is packaged. Coupon portion 307, like coupon portion 207 shown in FIG. 2, may be pre-printed or printed at the same time the printable elements of portion 305 are printed. In a particular example, coupon portion 307 has similar low-adhesive properties as portion 303 so that it can be readily separated from the remainder of label 301 by a consumer or by a checker at the point of sale. In this specific example, coupon portion 307 includes barcode information related to the incentive offer printed on a reverse side 311 to ease redemption by scanning at the point of sale. Once removed, coupon portion 307 is substantially identical to any number of other manufacturer coupons distributed by various means, and so can be redeemed and processed using conventional mechanisms for handling coupons.

Figure 4:
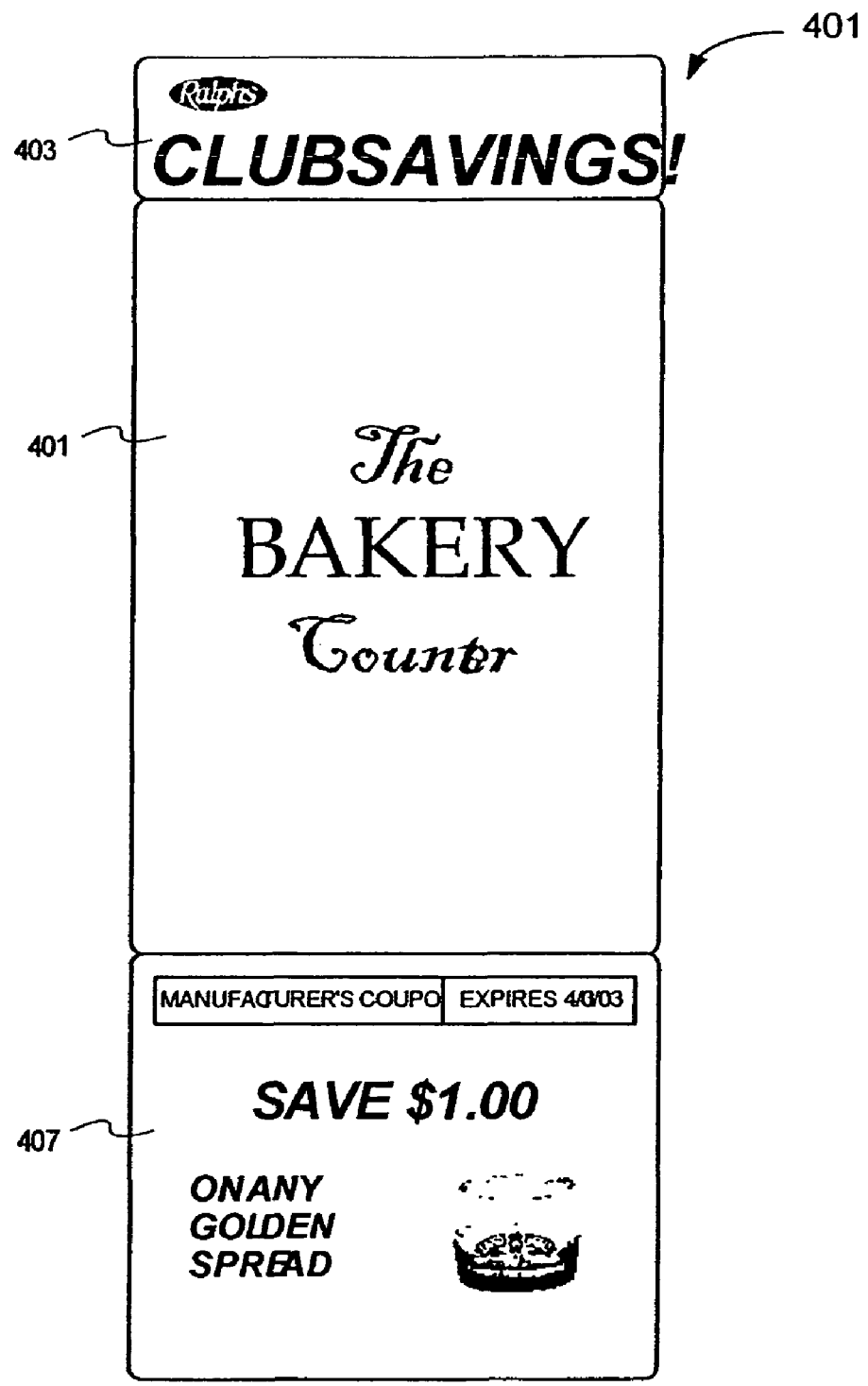
FIG. 4 shows example label coupon in accordance with the present invention.

FIG. 4 shows another example label coupon in accordance with the present invention adapted for use in a specialty department. In the case of the label 401, an optional header portion 401 is provided with pre-printed and/or dynamically printed components similar to header portion 301 shown in FIG. 3. Product identification portion 403 includes pre-printed information over which product specific information may be printed at the time of packaging or product selection. Coupon portion 407, like coupon portions 207 and 307, includes incentive offers or other promotions that encourage purchase of a product other than the product to which label 401 is affixed. It is desirable in many instances to format coupon portion 407 to be removable so that it can be readily redeemed and processed in a manner similar to conventional coupons and incentives.

FIG. 5 illustrates a roll of label coupon in a form for practical delivery within a retail environment. Specialty department printers use label stock that is usually delivered in rolls 501. The labels, such as labels 401 in FIG. 5, are cut and formed for manual and/or automated application to a product package, and often contain pre-printed components as well as space for product-specific printing that is added at the time of packaging. In accordance with the present invention, rolls 501 contain a repeating series of incentives such that adjacent labels 401 have different incentive offers for different products. Desirably, rolls 501 that are intended for use in a bakery, for example, will have a different series of incentives than would appear on rolls 501 intended for use in a delicatessen, meat department, or other specialty department. In this manner, the incentives printed on a label 401 are targeted by the consumer's selection of a specialty department in addition to or instead of their selection of a specific product.

FIG. 6 illustrates, in flow-diagram form, activities involved in a shopping experience involving various features of the present invention. At 601, a consumer enters the store and is exposed to a variety of product and service offerings in 603. Initially, the consumer directs himself/herself to areas of interest within the store that have products of interest. This exploration may bring the consumer to or near a specialty department such as the bakery, delicatessen, pharmacy, flower shop, or the like.

When a consumer selects the specialty shop in 605 as a place to select products, the consumer has made an initial selection that can be used to infer that consumers immediate shopping intentions and desires. The present invention recognizes that a consumer who selects the fresh meat department is likely in need of other products related to the meat purchase, or is has particular shopping characteristics in common with other fresh meat department consumers that suggest other products that may be of interest to that consumer.

The consumer is presented with the available department-specific product choices in 607, in response to which the consumer will make a specific product selection in 609. The specific product selection may involve interaction with a counter attendant to select, weight, package and label a particular item or items, or the product selection may be from a plurality of pre-packaged and pre-labeled goods in a meat case. Similarly, activity 609 might involve a mix of self-service and assisted service as might occur in salad bar, bakery, or buffet-style prepared foods departments. In any case, the particular selections provide even more information about the consumer's specific needs and desires and/or imply information about the consumer's shopping habits.

In accordance with the present invention, incentives can be provided in variety of manners after the point of product selection 609. In general, operations 613 and 615 involve pre-printed coupons supplied on label rolls 501 show in FIG. 5. Operations 633 and 635 illustrate the use of in-store printed coupons where the coupon can be specifically selected from a database of available incentive offers after the product selection.

In some embodiments, an incentive is provided in 613 that is based on the department selection alone as indicated by the consumer in step 605. For example, a label roll 501 containing department-specific coupons 207/307/407 is readily tailored to provide incentives that are targeted to consumers who use that particular department. These pre-printed coupons may be pre-applied to the package that the consumer selects in step 609, or may be provided when a package-specific label 201/301/401 is printed. This is a cost effective way to distribute incentives that are targeted based on consumer product selections at a department level.

Alternatively or in addition, the incentive may be related to package-specific or product-specific information indicated by the consumer in step 609 as indicated in 615. Pre-printed coupons can be used for implementation 615 as well. In the case of pre-printed coupons, the label roll 501 is used for a more specific set of products rather than for all products in that specialty department. A roll 501 might be used specifically for steaks, and another roll 501 for roasts, enabling the incentives to be targeted as specifically as desired.

While the present invention does not require information about shopping history, it is readily adapted to use shopping history information such as might be obtained by using a shopping card or loyalty card in operation 611. Shopping history information can be combined with the instantaneous product selection information indicated during activities 605 and 609 to provide uniquely targeted incentives. However, it is also practical and useful to bypass (i.e., not implement) shopping history lookup operation 611 as desired in a particular implementation.

When it is possible to print the incentives in-store on a label-by-label basis, the particular consumer's selection will indicate product type, weight, price, UPC code, and other attributes that will enable a selection-specific or package-specific incentive to be provided. In operation 621, an incentive database is consulted using a combination of information such as the department identity determined in 605, package specific and/or product specific information determined in 609, shopping history and/or demographic information obtained in 611. These pieces of information can be used alone or in combination to meet the needs of a particular application. Operation 621 identifies one or more incentives that are to be supplied to the consumer with the selected product. In operations 633 and 635, the incentive is provided to the consumer by, for example, printing the coupon with the label printing as described hereinbefore. In operation 633, the incentive is based on the more general department selection, whereas in operation 635 an incentive based on the more specific product-selection information is provided. In either operation 633 or 635, shopping history or the like may be used in addition to the product selection information.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed. For example, coupons are now provided in printed form, but the present invention is readily extended to non-paper coupon types such as might be implemented with RF ID tags or the like by programming label coupons into the label tag that accompanies the product.

I claim:

1. A method for distributing manufacturer coupons in a retail store comprising:

receiving on one or more specialty department computers incentive offer information from one or more incentive databases;

providing a supply of labels to one or more label printing devices, each label including at least a product information portion for printing information relating to a product being purchased in a specialty department and having a front side and a rear side, the front side of the preprinted manufacturer coupon portion having preprinted incentive offer information received from the one or more incentive databases, the incentive offer information including preprinted product discount amount information relating to a product complementary to but different than the product being purchased in the specialty department and to ease redemption by scanning at a point of sale, the rear side of the preprinted manufacturer coupon portion including preprinted barcode information relating to the preprinted discount amount information, a relationship between the preprinted product discount amount information and the preprinted barcode information being defined prior to the supply of labels being provided to the one or more label printing devices;

accepting by the one or more specialty department computers a request for the product being purchased from a consumer at the specialty department location in the retail store;

printing by the one or more label printing devices, on the front side of the product information portion of one of the labels, attribute information relating to the product being purchased;

affixing the rear side of the product information portion of the label with the coupon portion of the label to the product being purchased; and providing the consumer with the product including the affixed product information portion and the preprinted manufacturer coupon portion after the consumer has requested the product and before the point of sale so that the consumer can purchase the product complementary to but different than the product being purchased and redeem the coupon portion for the product complementary to but different than the product being purchased at the point of sale at the same time as the product being purchased.

2. The method of claim 1 wherein the incentive offer information is for a product determined based on the consumer's selection of a particular specialty department.

3. The method of claim 1 wherein the step of printing is performed in store.

4. The method of claim 1 wherein the step of printing is performed at the specialty department.

5. The method of claim 1 wherein the step of printing comprises the step of coupling the one or more label printing devices to equipment used to package the product.

6. The method of claim 1 wherein the step of printing comprises the step of coupling the one or more label printing devices to equipment used to weigh the product.

7. The method of claim 1 wherein the incentive offer information is for a product different than the product requested by the consumer.

8. The method of claim 1, wherein the product information portion and the coupon portion are removably attached.

9. The method of claim 1, wherein the attribute information comprises at least one of price per-pound, total price, weight and date.

10. A method of distributing manufacturer coupons comprising:

receiving on one or more specialty department computers incentive offer information from one or more incentive databases;

identifying by the one or more specialty department computers a specific product selected in a specialty department by a consumer;

estimating by the one or more specialty department computers at least one additional product desired by the consumer based on the type of specialty department and the incentive offer information from the one or more incentive databases, the at least one additional product being complementary to but different than the specific product selected; and providing a preprinted manufacturer coupon for at least one additional product based on the type of specialty department and the incentive offer information, wherein the preprinted manufacturer coupon is integral to a label printed for the specific product selected in the specialty department and is for a product different from the specific product selected, a front side of the preprinted manufacturer coupon including preprinted incentive offer information relating to the product different from the specific product selected and, to ease redemption by scanning at a point of sale, a rear side of the preprinted manufacturer coupon including a preprinted barcode relating to a predefined discount amount, wherein a consumer purchases the specific product selected and the product different from the specific product selected and redeems the preprinted manufacturer coupon for the product different from the specific product selected at the point of sale at the same time as the product selected.

11. The method of claim 10 wherein the step of providing a coupon comprises the steps of:

supplying a coupon on each of a plurality of product labels; and printing by the one or more label printing devices package-specific information regarding the specific product on one of the product labels: and affixing the product label with package-specific information to a package containing the specific product.

12. The method of claim 11 wherein the step of printing package specific information comprises coupling the one or more label printing devices to equipment used to package the specific product.

13. The method of claim 11 wherein the step of printing package specific information comprises coupling the one or more label printing devices to equipment used to weigh the specific product.

* * * * *